Oct. 9, 1934.   I. JEPPSSON   1,975,949
KITCHEN UTENSIL
Filed Aug. 13, 1932   2 Sheets-Sheet 1

Inventor
Ivar Jeppsson
By Wilson, Dowell, McCanna & Rehm
Attys

Oct. 9, 1934.　　I. JEPPSSON　　1,975,949
KITCHEN UTENSIL
Filed Aug. 13, 1932　　2 Sheets-Sheet 2
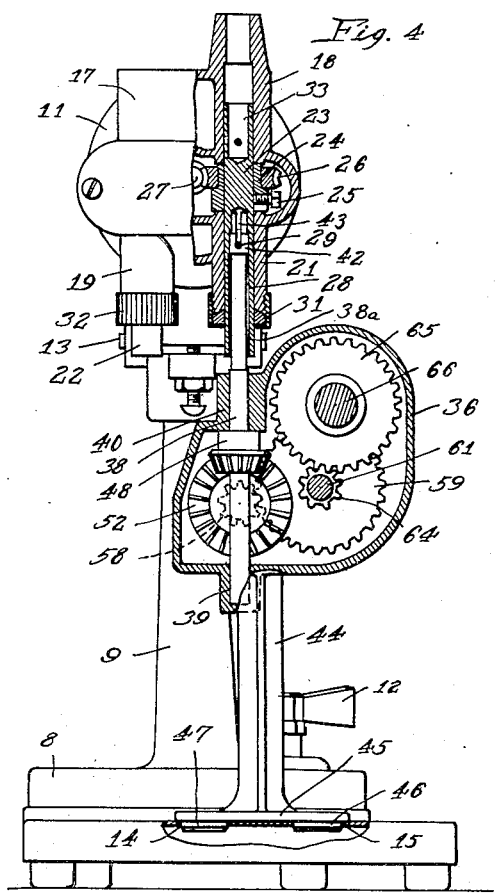
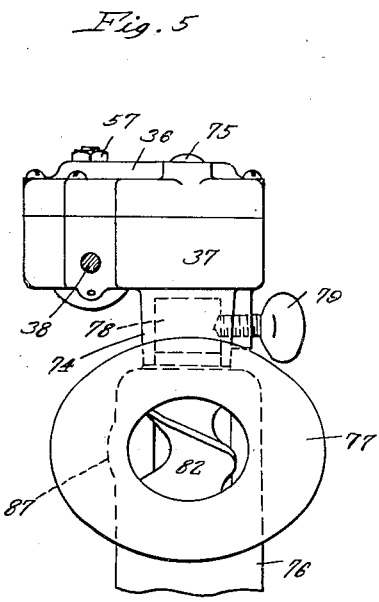
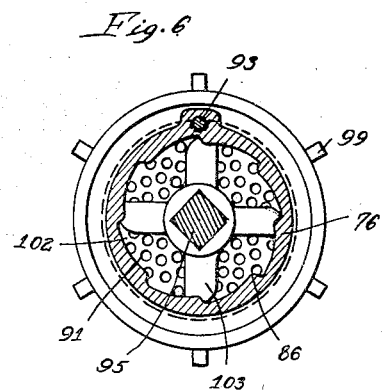
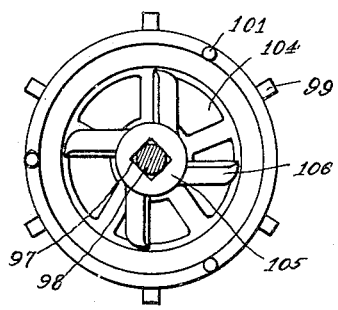
Inventor:
Ivar Jeppsson
By Wilson, Dowell, McCanna & Rehm
Attys.

Patented Oct. 9, 1934

1,975,949

UNITED STATES PATENT OFFICE 1,975,949

KITCHEN UTENSIL

Ivar Jeppsson, Chicago, Ill., assignor to Chicago Flexible Shaft Company, Chicago, Ill., a corporation of Illinois Application August 13, 1932, Serial No. 628,625

9 Claims. (Cl. 74—16)

This invention relates to kitchen utensils and has particular reference to a power operated attachment arranged to be driven from the motor of a beater.

The invention has for its principal object the provision of a combination power operated kitchen beater having an appliance arranged to be driven by the motor through common driving mechanism, and having attachable supplemental gear mechanism for driving the appliance at a different speed.

A further object of the invention is the provision of improved means for supporting an appliance in a position to be driven by the motor of a power operated utensil.

Another object of the invention is to provide a food cutter of improved construction and efficiency.

A still further object of the invention is to provide improved means for driving a kitchen implement from the motor of a power operated utensil.

I have also aimed to provide a machine capable, through an exchange of parts, of exercising any of a number of common household functions.

Another aim of the invention is the provision of a gear box and supporting member arranged to support and drive a plurality of household implements from a household beater.

An important object of the invention is the provision of a mechanism having ready means for supporting supplementary devices at two or more points to secure these parts without the use of bolts or other extraneous fastening means.

Other objects and attendant advantages will become apparent to those skilled in the art from the following description and the accompanying drawings, in which—

Fig. 4 is a front view of the food cutter, partly in section showing the driving train;

Fig. 5 is a fragmentary top view of the food cutting attachment;

Fig. 6 is a view taken on the line 6—6 of Fig. 2; and

Fig. 7 is a view taken on the line 7—7 of Fig. 3.

Figure 1:
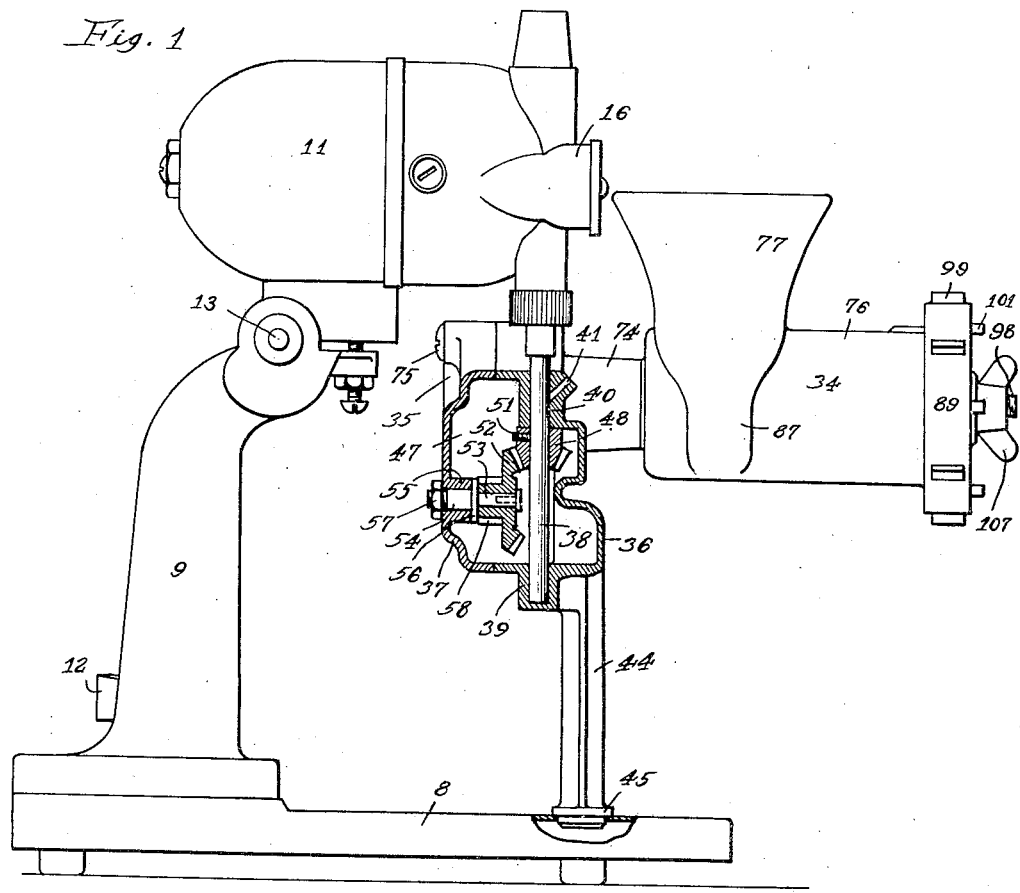
Figure 1 is a side view of the food cutter shown partly in section.

The form of the invention shown in the drawings contemplates an appliance suitable for use with a mixer such as shown and described in the copending application of John W. Lynch, Serial No. 618,975, filed June 23, 1932, the numeral 8 designating the base, the numeral 9 designating the upright and the numeral 11 designating the motor enclosed in a housing such as shown and described in said application. A control lever 12 serves to control the speed of the motor 11. The motor is connected to the upright 9 through a hinge connection 13 through which the motor may be rotated from the horizontal position shown in Figure 1 to a substantially inclined position. The base 8 is provided with a pair of bearing sockets 14 and 15 arranged in the beating function of the device to support the table in operative positions with respect to the beaters. The front of the motor housing 11 is provided with a gear housing portion 16 and spaced upper and lower sleeve bearings 17, 18, 19 and 21. Spindles 22 and 23 are rotatably positioned in the bearings and are retained therein by sleeves 24 in the gear housing portion secured to the spindles by means of set screws 25. The spindles are driven by means of worm gears 26 on the sleeves 24 and a worm 27 on the end of the motor shaft. Each of the spindles is provided with a socket 28 in the lower end thereof and a cross-pin 29 which extends across the socket near the upper end thereof. In the above-mentioned application, these sockets are shown and described as receiving the same. Stuffing boxes 31 and 32 at the lower end of the bearings 19 and 21 serve to prevent the escape of lubricant along the bearing. The upper end of the spindles may be provided with a socket or sockets 33 for the purpose of driving other utensils from the upper end of the spindle if desired.

The appliance here shown for purpose of illustration consists of an implement 34 and a gear box and supporting member 35 arranged to be positioned in operative relationship with the motor. The gear box consists of a two-piece casing designated by the numerals 36 and 37. A driving shaft 38 is positioned vertically in the casing portion 36 and has bearing support therein at 39 and 40. A channel 41 extends inward to the surface of the bearing 40 to permit lubrication of the upper bearing. The upper portion of the shaft 38 extends into the socket 28 of the spindle 23 and is slightly relieved, as shown at 38ª, whereby to space the surface of the shaft from the face of the socket 28 and also to provide a shoulder 42. The upper end of the shaft 38 is slotted, as shown at 43, to receive the cross-pin 29 whereby to drive the shaft from the spindle 23. The casing portion 36 also has a leg 44 provided with a foot 45 at its lower end. Bosses 46 and 47 project from the lower surface of the foot 45 and are shaped and positioned for reception in the bearing sockets 14 and 15 of the base. The leg 44 serves to hold the gear box and implement in proper vertical position while the foot and bosses serve to prevent rotation of the gear box.

A beveled gear 48 is affixed to the shaft 38 within the gear chamber 49 of the gear box by means of a set screw 51 and meshes with a second beveled gear 52. The gear 52 is rotatably supported on a bearing pin 53 which has a shank 54 passing through a boss 55 on the casing portion 35 and a shoulder 56 arranged to be drawn tightly against one end of the boss by means of a nut 57. The hub of the gear 52 is provided with teeth 58 forming a spur gear integral with the gear 52. The teeth 58 serve to drive a gear 59 threaded onto a shaft 61 which is rotatably supported at each end in sleeve bearings 62 and 63 on the casing portions 35 and 36. Integral with the shaft 61 is a spur gear 64 which drives a gear 65 which is threaded on a shaft 66 rotatably supported in sleeve bearings 67 and 68 also formed integral with the casing portions 35 and 36. The shaft 66 is provided with a shoulder 69 arranged to bear against the end of the sleeve 67 and with a portion 71 extending through the side wall of the casing portion 36. The protruding end 71 of the shaft 66 is provided with a pair of projections 72 and 73 arranged to form the groove of a tongue and groove connection. Surrounding the projecting end 71 and integral with the casing portion 36 is a boss 74 arranged to support the implement 34. A screw 75 extends through the wall of the casing portion 35 for the purpose of plugging an opening provided in the casing for the purpose of injecting lubricant or grease into the gear chamber 49.

While a specific form of gear box has been described and shown, it will be understood that this mechanism may take many forms, the important thing being that it be supported from the base or the motor so as to occupy a balanced position in driving relation with the motor.

The implement 34 in this instance consists of a food cutter, though numerous other implements are contemplated and may be supported on the gear box and supporting member, such, for example, as a can opener, a vegetable slicer and shredder, a potato peeler, a knife sharpener, etc.

Figures 2, 3:
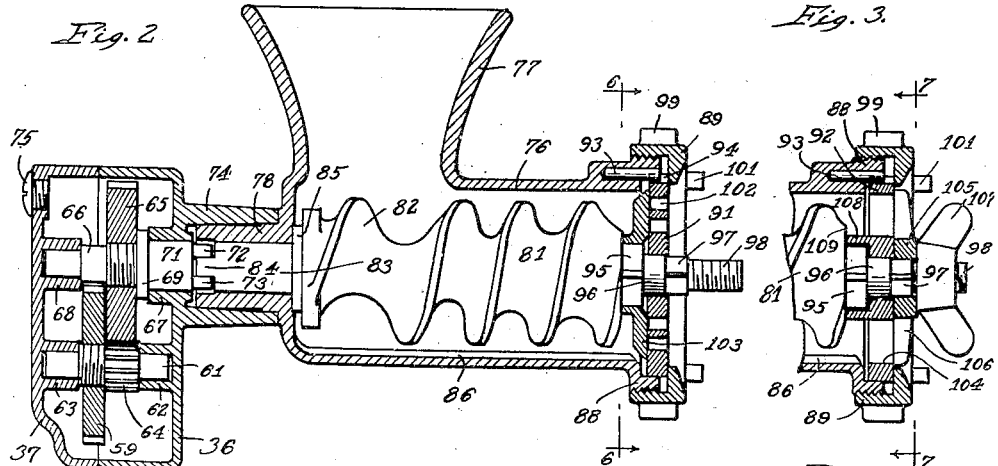
Fig. 2 is a vertical section taken longitudinally through the food cutting attachment having one type of knives and cutter plates.
Fig. 3 is a fragmentary section showing a modified form of knife and plate.

The food chopper here shown for purpose of illustration includes a food hopper comprising a cylindrical portion 76 and a feeding cone 77. The rear end of the cylindrical portion 76 is provided with a sleeve 78 for reception into the boss 74 within which it is secured by means of a set screw 79 which extends through the side walls of the boss and into a depression in the sleeve 78. Within the cylindrical portion of the food hopper is a worm 81 arranged through its rotation to carry the food from the lower end of the cone 77 to the front end of the cylinder. The first convolution 82 of the worm is of greater pitch than the remainder, as shown in Fig. 2, thereby providing greater space between the convolutions, whereby the food from the cone may be more readily carried into the worm. A stub shaft 83 is integral with the worm 81 and extends through the sleeve 78 and has a tongue 84 at its end arranged to cooperate with the projections 72 and 73 to form a tongue and groove connection whereby the same is driven from the shaft 66. Between the stub shaft 83 and the worm 82 is a shoulder 85 arranged to bear against the inner surface of the food hopper around the stub shaft 83 to prevent the passage of liquids out of the food hopper along the interface of the sleeve 78 and the shaft 83. The inner surface of the sleeve portion 76 is provided with ribs 86 adapted to cooperate with the worm in advancing the food. The cylinder 76 is provided with a recess or relieved portion 87 on its inner surface at the point where the cone 77 joins the cylinder and upon that side of the cylinder at which the food is carried downward by rotation of the same so as to facilitate the movement of the food into the worm, as shown in Figures 1 and 5. The outer or front end of the cylinder 76 is threaded on its outer surface, as shown at 88, for the reception of a retaining ring 89 for the purpose of retaining the cutter plates 91 and 92 in position against the end of the cylinder 76. A pin 93 is positioned to be received in a slot or groove 94 in the cutter plates to prevent rotation of the cutter plates with the worm 81. The front end of the worm 81 is provided successively with a squared section 95, a cylindrical section 96, a squared section 97, and a threaded section 98, the cylindrical section 96 being arranged to rest in a central cylindrical opening in the cutter plates 91 and 92 in the normal operating position of the parts serving to support the front end of the worm 81. Lugs 99 and pins 101 on the retainer ring serve to facilitate the tightening and loosening of the ring on the threaded portion 88 of the cylinder.

The cutting operations desired to be accomplished by a utensil of this character are, in general, of two natures, that employed in the cutting of meats and that employed in the cutting of vegetables, fruits, etc. The mechanism of the present invention is designed to accomplish both of these cutting operations through the mere inter-change of the cutter knives and plates. In Figs. 2 and 6, mechanism is shown best adapted for the purpose of cutting meats. In this instance, the plate 91 is provided with a plurality of relatively small extruding openings 102 through which the worm 81 is adapted to extrude the meat. A cutter knife 103 is provided with a plurality of blades and a squared center opening arranged to receive the squared section 95 so that upon rotation of the worm the knife will be rotated with the blades in contact with the inner side of the plate 91. In Figs. 3 and 7, I have shown mechanism adapted for the purpose of cutting vegetables and fruits. In this instance, the cutter plate 92 is provided with a plurality of relatively large openings 104 through which the food is extruded through operation of the worm 81. A cutter knife 105 is provided with a plurality of blades 106 arranged to bear against the outside of the cutter plate 92, the center of the cutter knife having a squared opening for the reception of the section 97 on the worm, whereby the knife is rotated through rotation of the worm. The knife is held in contact with the cutter plate by means of a wing nut 107 engaging the threaded end 98 of the worm member and bearing against the cutter knife. The cutter plate 92 is provided at its center with a flange 108 arranged to surround the squared portion 95 of the worm member and bear against a shoulder 109 between the section 95 of the worm member and the worm proper in order to hold the worm against endwise movement. Thus, in the use of the mechanism shown in Fig. 2, the retainer ring 89 when screwed up on the threaded portion 88 draws the plate 91 inward against the knife 103 which, in turn, bears against the worm. This provides a means for preventing endwise movement of the worm and at the same time provides a cutting pressure between the cutting knife and the cutting plate. On the other hand, in the use of the device shown in Fig. 3, the retainer ring 89 presses the cutter plate 92 directly against the worm member through the flange 108 and the tension between the cutter plate and the cutter knife is adjusted by means of the wing nut 107.

In operation, the beater shown in the first mentioned application is converted into a food cutting mechanism by the removal of the beater blades, the table and bowls. The motor is rotated to the vertical position or to some position between the position shown in Figure 1 and a vertical position, and the shaft 38 is inserted in the socket of the spindle 23. The motor 11 is then rotated into the position shown in Figure 1 in which the bosses 46 and 47 slip into the sockets 14 and 15 of the base 8, thus positioning the gear box. It will be seen that the leg 44 supports the gear box and food hopper at the desired elevation for driving from the spindle, whereas the foot 45 and buttons 46 and 47 secure the mechanism in the desired angular position and prevent rotation of the gear box under the driving force of the spindles. The control lever 12 is then rotated until the desired cutter speed is attained whereupon the food to be cut may be fed into the top of the cone 77 and forced downward into contact with the worm 81 which, through rotation, carries the food forward against the cutter plate 91 or 92, as the case may be, causing it to be extruded through the openings in the cutter plate and be cut off by rotation of the cutter knife.

It will be seen that the mechanism is so arranged that the motor 11, normally employed for the purpose of driving a beater, may be utilized for the purpose of driving the additional appliances without in any way impairing its efficiency in its beating function. An important advantage of the present construction is that the implement 34 may be conveniently and speedily removed from the gear box 35 so that it may be cleaned while free from this mechanism. In this manner, the gear box and supporting means are formed as a separate unit and the washing of the implement need in no way interfere with the lubrication of the gear box. Another advantage lies in the fact that the construction is such that the juices from the interior of the food hopper cannot pass out through the back so that they will drip on the table or other supporting member, but are forced to follow along with the remainder of the food and pass through the front of the cutter. Another new and novel combination in the present invention lies in the fact that the mechanism embodies both a meat grinder and a food chopper, the machine being convertible from one to the other by a simple interchange of cutter plates and knives. This is accomplished through the shape characteristics of the cutter plates and knives and through the provision of the squared sections 95 and 97, the cylindrical section 96 and the threaded section 98 so arranged that the desired cutting action may be obtained through the exchange of parts.

Attention is directed to the facility with which the food cutter or other appliance may be attached, the construction being such that the mere act of swinging the motor into its operative or horizontal position serves to fasten the gear box and appliance, supporting them in driving relation with the motor and preventing rotation in operation. This is accomplished without the use of bolts, screws, or other like extraneous fastening means. Similarly, the gear box need only be swung slightly out of the operative position to permit its ready withdrawal from its operative relationship with the motor.

From the foregoing it will be apparent that while I have shown a particular form of appliance, this is for purpose of illustration only and that other appliances and implements may be used within the contemplation of my invention. The parts referred to as the gear box and supporting member are, in fact, a power transfer unit having what may be termed a power input shaft 38 and a power output shaft 66 with interposed reduction gearing. To this power transfer unit may be attached at the output end any implement or attachment of the type adapted to be power driven. In the case here illustrated, the implement 34 is a food cutter or grinder wholly supported by the power transfer unit. This implement and the power transfer unit are, in effect, a single implement and may be removed from or placed into working position as a unit. This is characteristic of one phase of my invention in which the food working implement is combined as a unit with the parts above referred to as the power transfer unit. However, it is immaterial in the broader aspect of my invention whether or not the food working implement per se is combined with or made detachable from the power transfer and supporting part of the device. One of the features of my invention is, therefore, the provision of means whereby an implement is quickly attachable to a motor driven device and has firm and stable support in the working position without the need of extraneous fastening or clamping devices. To this end in the preferred embodiment the power driven spindle 23 is supported so that it may be quickly and easily moved into and out of working position. When moved out of the working position, the implement may be quickly attached. The implement is attached by inserting its drive power input shaft 38 into the socket of the drive spindle 23, thus establishing driving connection therewith. By positioning the implement on the base with its bosses 45 seated in the locating and retaining sockets 14 and 15, which may in practice be in the form of a single socket as desired, the implement is retained in working position. According to my invention the implement interposed between the power driven spindle and the base is held in this position by reason of its connection with the base and the spindle, and these connections are such as to permit quick removal of the implement simply by the act of withdrawing the spindle from its working position, as, for example, by tilting the spindle support upwardly on its pivot mounting and at the same time withdrawing the retaining bosses 45 from the sockets in the base. Thus the implement is free for removal from the device. Obviously, any implement of this type may be quickly and easily placed in operating position and removed. This is particularly desirable in connection with motor driven implements for kitchen use. With my invention only a single motor unit is required and any of a variety of implements or appliances may be quickly and easily attached to the motor driven spindle and supported in a firm and stable manner. Another advantage of my invention is found in its simplicity which makes for easy operation by the housewife or kitchen attendant, it being noted that there are no extraneous fastening devices to be handled. This avoids confusion and uncertainty in the interchange of implements and avoids the objections found in certain prior art devices which have complicated mechanisms for the interchange of one implement for another.

While I have thus described and illustrated a specific embodiment of my invention, I am aware that numerous alterations and changes may be made therein without materially departing from the spirit of the invention or the scope of the appended claims, in which

I claim:

1. A motor driven device for operating implement attachments having, in combination, a base, a spindle driven by the motor and having a socket at its lower end adapted to receive the shaft of an implement for driving it, a support for the spindle pivotally mounted on the base, whereby said support and spindle may swing to and from a working position, an implement interposed between the base and said support, the implement having a projecting shaft inserted into and detachably held in said spindle socket in driving connection therewith when the spindle and support occupy the working position, and means for removably retaining the lower end of the implement on the base for rotation with said spindle and support, whereby said implement may be removed by swinging said support on its pivot and detaching said implement from said socket.

2. A motor driven device for operating implement attachments having, in combination, a base, a spindle driven by the motor and having a socket at its lower end adapted to receive the shaft of an implement for driving it, a support for the spindle, means whereby said support may be moved with respect to the base to and from a working position, an implement interposed between the base and said support, the implement having a projecting shaft inserted into and detachably held in said spindle socket in driving connection therewith, and means for removably retaining the lower end of the implement on the base, whereby said implement may be removed by moving said support away from its said working position and thereafter detaching said implement from said socket.

3. The combination of a motor driven device having a vertical motor driven spindle provided with a socket in its lower end, a base on which said spindle is mounted in an overhead position, the base having a locating and retaining socket, an implement interposed between the base and spindle having a drive part located in the spindle socket and means located in the base socket the driving part and said last mentioned means retaining the implement in working position, means providing detachable driving connection between the spindle and the implement drive part, and means providing for movement of the spindle away from its said position whereby the implement may thereafter be removed by withdrawing its drive part from the spindle socket.

4. A motor driven device for operating implement attachments having, in combination, a base provided with a socket, a spindle driven by the motor, a support for the spindle pivotally mounted on the base whereby said support and spindle may swing to and from a working position, an implement of the type adapted to be power driven interposed between the base and said pivoted support, said implement having means fitting in said socket to locate and hold the implement against lateral displacement, and means providing a driving connection between said spindle and the driving part of the implement, said support serving to hold the implement in working position on the base against upward displacement from said socket, and said implement being removable from its said working position when said support is swung away from its said working position.

5. A motor driven device for operating implement attachments having, in combination, a base provided with a socket, a spindle driven by the motor, a support for the spindle mounted on the base with capacity for movement thereon to and from a working position, means on the spindle for attaching implements thereto, an implement in a working position interposed between the base and the support, said implement having a drive shaft and a locating and retaining projection, said projection being shaped to enter said socket in the base and retained thereby against lateral displacement, and means detachably connecting the implement drive shaft to the spindle, the connection between said spindle and implement drive shaft and between said implement projection and said socket serving to hold the implement in working position, and said support being movable away from its said working position to break said socket connection and thereafter permit quick removal of the implement from its said spindle connection and its said socket connection.

6. The combination with a household mixer of the type having a base and a motor driven spindle, the spindle being movable to and from a working position, of a power transfer unit having a power input shaft and a power output shaft, means for attaching said input shaft to said spindle when the spindle is away from its said operating position, and means for locating and holding the lower end of the power transfer unit on the base against lateral displacement when said unit is moved into working position.

7. The combination with a household mixer of the type having a base and a power driven spindle pivotally mounted in an overhead position on the base whereby said spindle may be tilted into and out of a vertical working position, of a power transfer unit having a power input shaft and a power output shaft, means for attaching said input shaft to said spindle when the latter is moved away from its said working position, and means for locating and holding the lower end of the power transfer unit on the base against lateral displacement when said unit is moved into said working position.

8. The combination with a household mixer of the type having a power driven spindle and a base provided with one or more sockets, the spindle being movable with respect to the base to and from a working position, of a food working implement having an upstanding drive shaft, and a supporting leg, said leg having retaining means shaped to seat in one or more of said sockets, and means for detachably connecting said implement drive shaft to said spindle when the latter is moved away from its said working position, said spindle when in its working position serving to hold the implement in working position on the base with said retaining means held in said sockets.

9. A motor driven device for operating implement attachments having, in combination, a base, a vertical spindle driven by the motor, a support for the spindle pivotally mounted on the base to swing upwardly and downwardly whereby to carry said spindle to and away from a vertical working position, an implement having a drive part, means providing driving connection between said implement drive part and said spindle when the latter is swung away from its said working position, and means providing a supporting and retaining connection between the lower end of the implement and the base when the implement together with the spindle and its support are swung as a unit to the said working position.

IVAR JEPPSSON.